United States Patent [19]

Reighard et al.

[11] Patent Number: 4,628,310

[45] Date of Patent: Dec. 9, 1986

[54] MULTIFUNCTION STEERING WHEEL

[75] Inventors: Robert P. Reighard, Holland; Wilbur L. McCoy, Toledo; William P. Gobeille, Sylvania, all of Ohio

[73] Assignee: Sheller-Globe Corporation, Toledo, Ohio

[21] Appl. No.: 794,953

[22] Filed: Nov. 1, 1985

Related U.S. Application Data

[63] Continuation of Ser. No. 475,891, Mar. 16, 1983, abandoned.

[51] Int. Cl.⁴ .............................................. G08C 23/00
[52] U.S. Cl. ........................... 340/825.72; 455/603; 340/825.69
[58] Field of Search ................. 361/19, 30, 33, 93, 361/100, 101; 200/302.1, 302.2; 307/10 R; 455/603, 89; 340/825.69, 825.72, 696; 371/70

[56] References Cited

U.S. PATENT DOCUMENTS

| | | |
|---|---|---|
| 3,544,743 | 12/1970 | Takel et al. . |
| 3,604,005 | 9/1971 | Glimore . |
| 3,624,603 | 11/1971 | Delcomyn ............................. 371/70 |
| 3,739,299 | 6/1973 | Adler . |
| 3,750,080 | 7/1973 | Rouvre et al. . |
| 3,793,491 | 2/1974 | Cryer . |
| 3,820,070 | 6/1974 | Fox . |
| 3,842,403 | 10/1974 | Konopka . |
| 3,854,123 | 12/1974 | Banach . |
| 3,866,177 | 2/1975 | Kawamata et al. . |
| 3,868,638 | 2/1975 | Johnson . |
| 3,881,076 | 4/1975 | Latka et al. . |
| 3,890,480 | 6/1975 | Berling et al. ..................... 200/302.2 |
| 3,892,932 | 7/1975 | Erdelitsch et al. . |
| 3,906,366 | 9/1975 | Minami et al. . |
| 3,924,120 | 12/1975 | Cox, III . |
| 3,934,101 | 1/1976 | Jones . |
| 3,940,579 | 2/1976 | Buhl . |
| 3,944,765 | 3/1976 | Kawai et al. . |
| 3,987,414 | 10/1976 | Tuma . |
| 4,006,328 | 2/1977 | Kimberlin et al. . |
| 4,027,280 | 5/1977 | Beyers, Jr. . |
| 4,045,771 | 8/1977 | Loreck ............................. 371/70 |
| 4,088,858 | 5/1978 | Kramer . |
| 4,091,272 | 5/1978 | Richter et al. . |
| 4,114,099 | 9/1978 | Hollander . |
| 4,131,772 | 12/1978 | Weckenmann et al. . |
| 4,143,368 | 3/1979 | Route et al. . |
| 4,149,048 | 4/1979 | Winter et al. . |
| 4,156,134 | 5/1979 | Minner . |
| 4,156,810 | 5/1979 | Tgarashi . |
| 4,169,226 | 9/1979 | Fukuji . |
| 4,179,592 | 12/1979 | Nitsch . |
| 4,218,595 | 8/1980 | Honjo . |
| 4,219,706 | 8/1980 | Koch et al. . |
| 4,219,709 | 8/1980 | Scarbro . |
| 4,227,259 | 10/1980 | Mogi . |
| 4,227,588 | 10/1980 | Biancardi . |
| 4,231,019 | 10/1980 | Junginger et al. . |
| 4,231,031 | 10/1980 | Crowther et al. . |
| 4,232,296 | 11/1980 | Filipovic . |
| 4,241,456 | 12/1980 | Nakagaki et al. . |
| 4,246,611 | 1/1981 | Davies . |
| 4,264,982 | 4/1981 | Sakarya . |
| 4,267,606 | 5/1981 | Stelter et al. . |
| 4,277,658 | 7/1981 | Delp et al. . |
| 4,293,743 | 10/1981 | Iwata et al. . |
| 4,303,911 | 12/1981 | Hulick . |
| 4,315,117 | 2/1982 | Kokubu et al. . |
| 4,321,437 | 3/1982 | Cryer . |
| 4,322,855 | 3/1982 | Mogi . |
| 4,425,647 | 1/1984 | Collins et al. ..................... 371/70 |
| 4,455,454 | 6/1984 | Umebayashi ..................... 455/89 X |
| 4,459,630 | 7/1984 | Beck ............................... 361/101 |

OTHER PUBLICATIONS

*Automotive Engineering*, Dec., 1982, p. 66 (author unknown).

*Primary Examiner*—Ulysses Weldon
*Attorney, Agent, or Firm*—Harness, Dickey & Pierce

[57] ABSTRACT

The multifunction steering wheel controls the operation of vehicle functions or devices such as headlights, windshield wipers, cruise control, and so forth, using a transmitter receiver pair to convey information relative to the operation of the devices between the rotatable steering wheel and stationary steering column. In particular, the transmitter receiver pair may take the form of an optoelectronic infrared transmitter disposed on the steering wheel member and a matching infrared receiver positioned on the steering column within the field of elimination of the transmitter.

1 Claim, 10 Drawing Figures

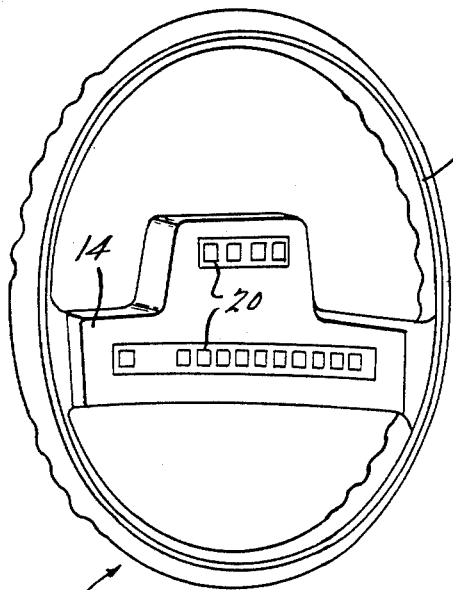
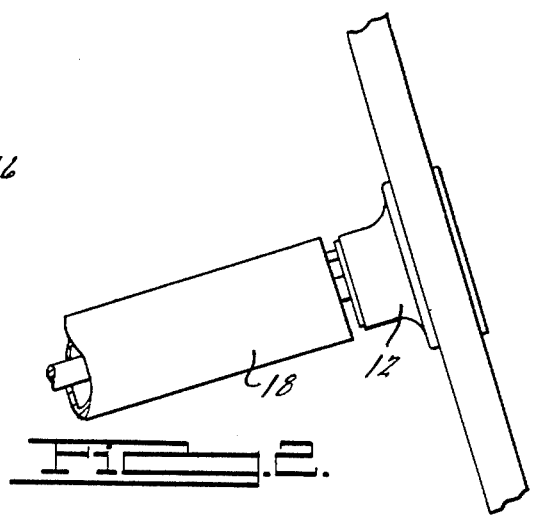
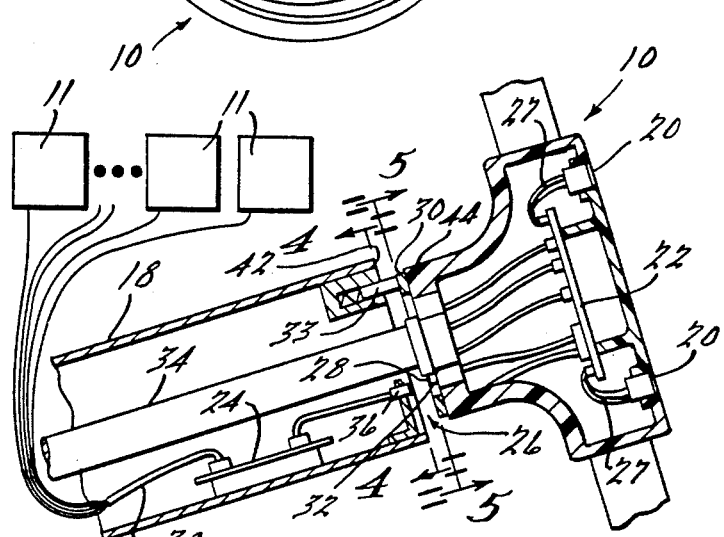
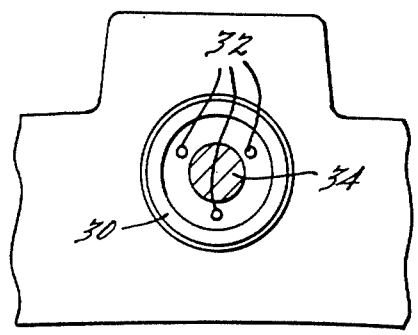
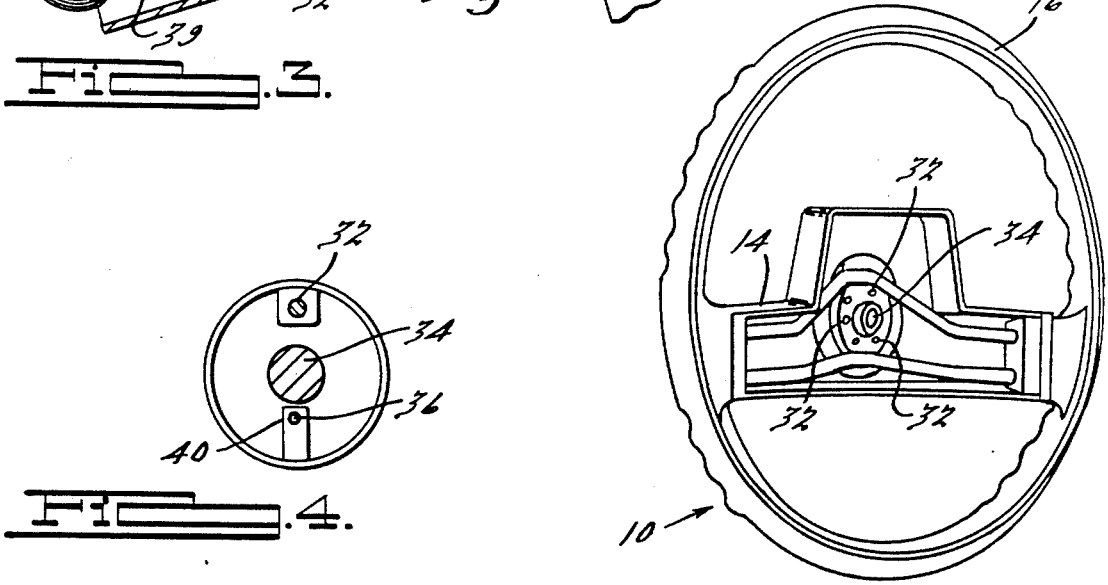

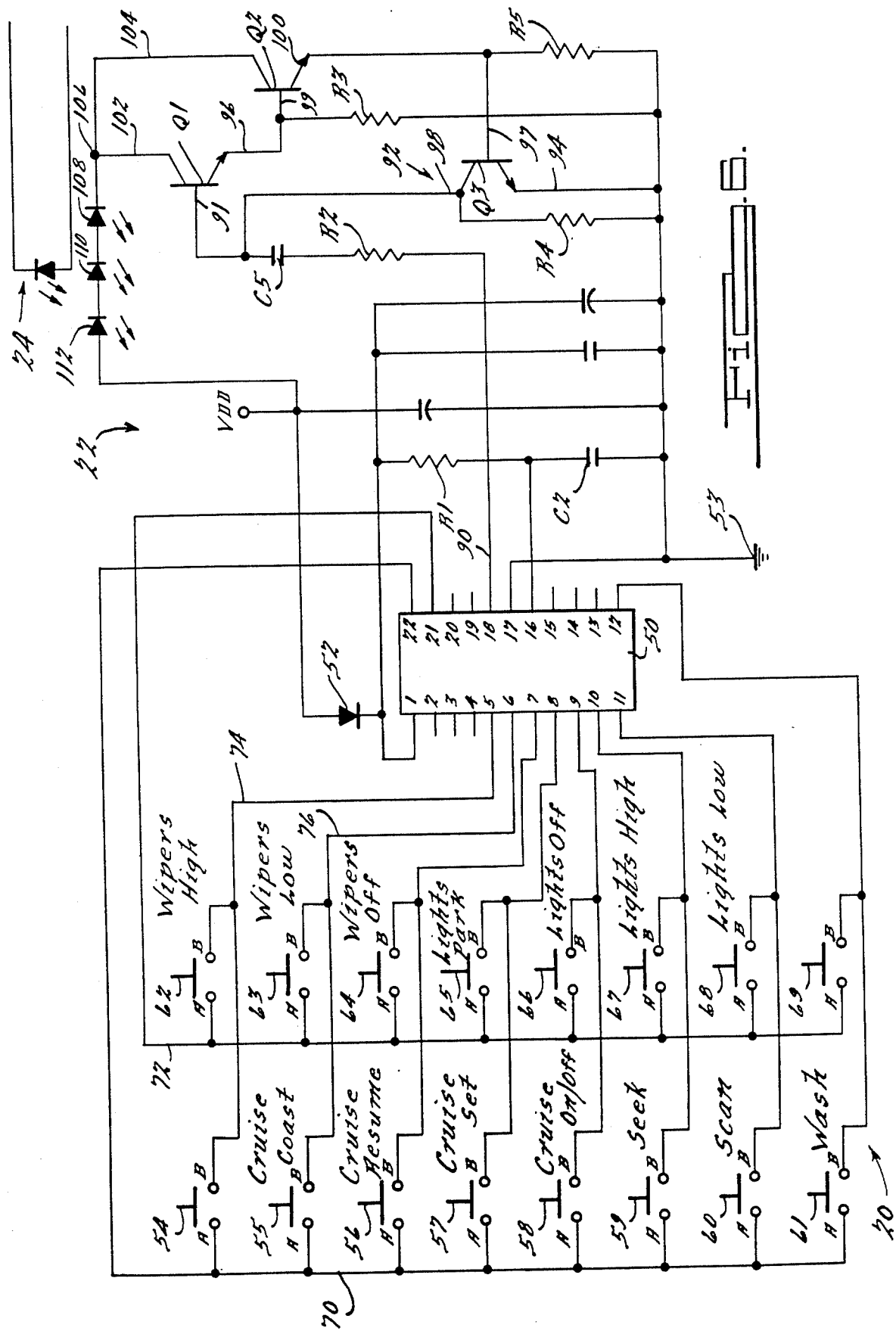

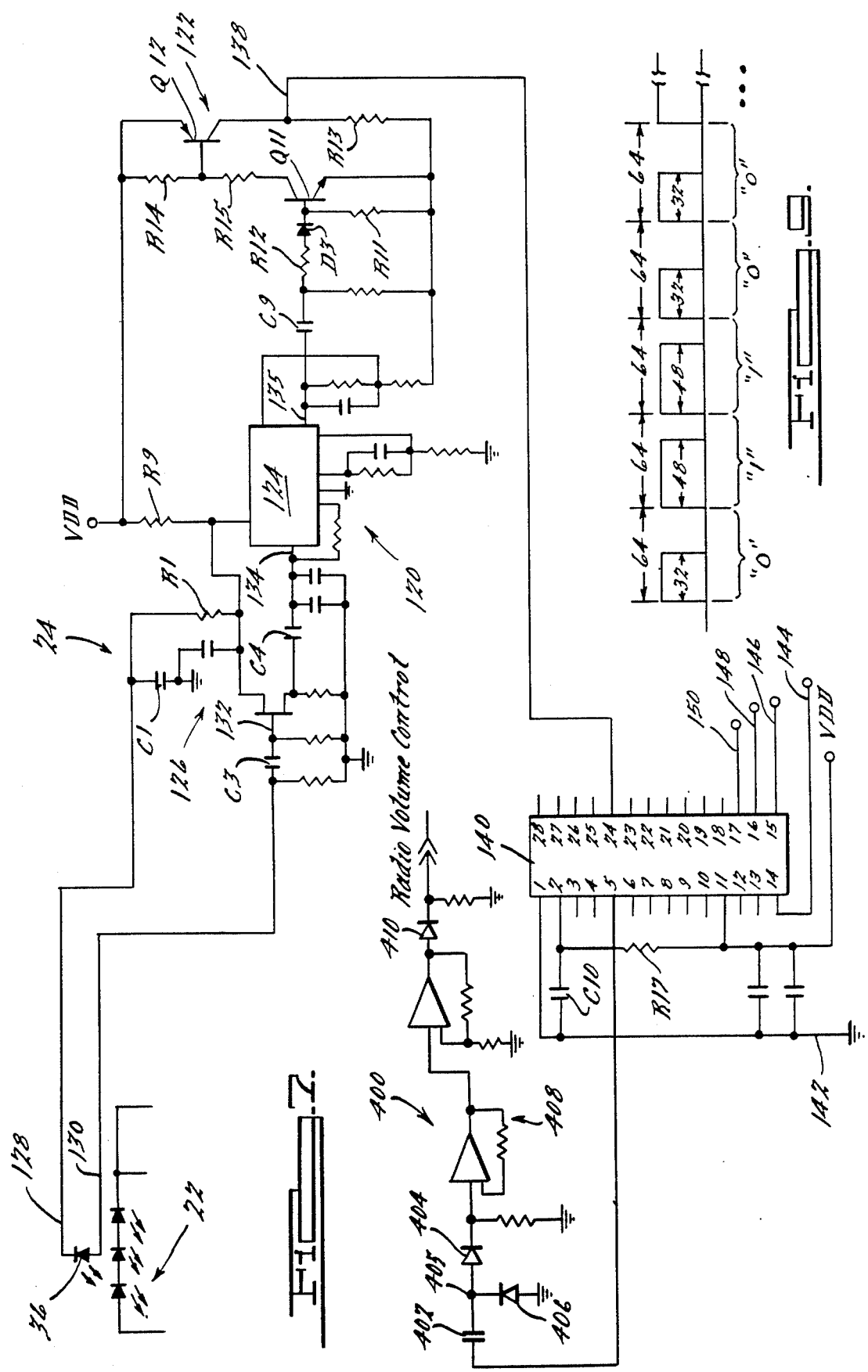

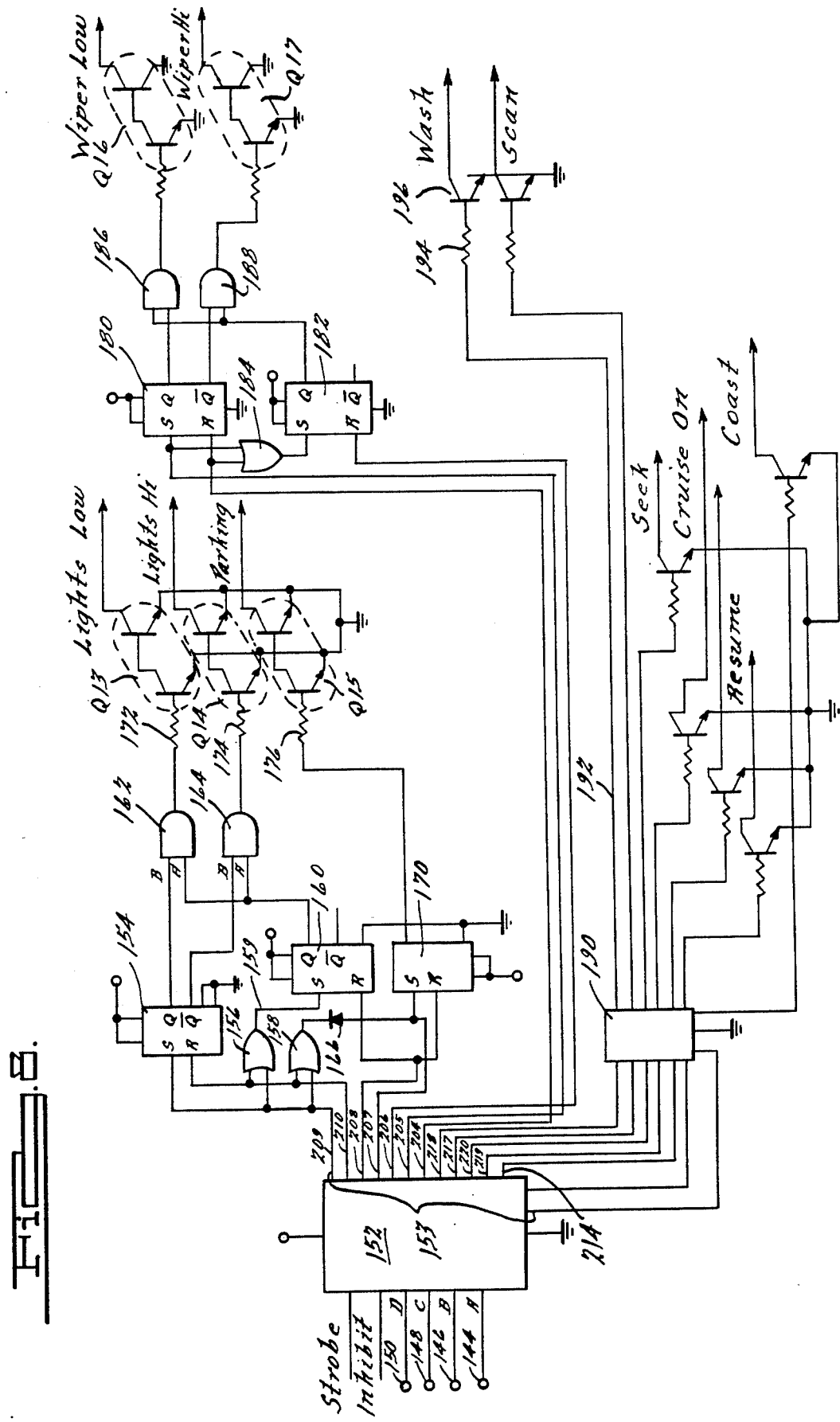

MULTIFUNCTION STEERING WHEEL

This application is a continuation of application Ser. No. 475,891, filed Mar. 16, 1983 now abandoned.

BACKGROUND OF THE INVENTION

This invention relates generally to steering wheels and multiple function switching assemblies. In particular the invention relates to a steering wheel for controlling a multiplicity of functions or devices on a vehicle by means of a remote control radiant energy transmitter/receiver pair.

DESCRIPTION OF THE PRIOR ART

With the trend towards providing the convenience and safety of a multiplicity of controls at a vehicle operator's fingertips, the conventional steering wheel and associated mounting column have grown in complexity. For example, it has been the practice to utilize the column mounted turn signal lever to operate other functions and devices on the vehicle such as, for example, a headlamp high beam/low beam selector, and to provide additional column mounted levers for controlling devices such as vehicle cruise control systems, windshield washer/wiper mechanisms, hazard warning lights, and the like. But there is a practical limit to how many such manually actuable switches may be conveniently and safely disposed on the steering column.

One solution might be to dispose some or all of these manually actuable switches on the steering wheel itself. The vehicle horn, for example, has traditionally been disposed on the steering wheel, and operates to activate the horn by closing a series circuit including the horn device and a conventional slip ring and wiper assembly. The conventional slip ring and wiper assembly allows electrical current to be conveyed between the relatively stationary steering column and the rotatable steering wheel without restricting the rotational freedom of the steering wheel.

When a multiplicity of switches, each controlling a separate device or function on the vehicle, are disposed on the rotatable steering wheel, the conventional slip ring and wiper assembly becomes impractical due to the limit on how many individual slip ring and wiper assemblies may be disposed between the steering wheel and column.

SUMMARY OF THE INVENTION

The present invention provides a multiplicity of manually actuable switches disposed on the steering wheel for controlling a variety of different functions or devices on the vehicle. The invention further includes a transmitter disposed on the steering wheel for producing radiant energy signals in response to actuation of the switches. As used herein, radiant energy is intended to include all forms of energy which can be said to radiate or propagate between one location and another, including electromagnetic energy, such as but not limited to radio frequency energy, infrared energy, optical energy, and ultraviolet energy, and further including other forms of propagating energy such as acoustical, sonic or ultrasonic energy. The transmitter of the presently preferred embodiment produces a radiant energy signal which may be encoded to convey a plurality of distinguishable signals corresponding to each of the switches, so that a plurality of individual functions or devices may be separately controlled. A receiver has an input port disposed on the steering column in a position to receive the radiant energy signals from the transmitter. The received signals are decoded by a control circuit which in turn provides control signals for controlling the operation of the plurality of functions or devices on the vehicle.

BRIEF DESCRIPTION OF THE DRAWINGS

FIG. 1 is a plan view of a steering wheel incorporating the invention;

FIG. 2 is a side view of the steering wheel incorporating the invention;

FIG. 3 is a fragmentary cross-sectional view taken along the line 3—3 of FIG. 1;

FIG. 4 is a cross-sectional view taken along the line 4—4 of FIG. 3;

FIG. 5 is a cross-sectional view taken along the line 5—5 of FIG. 3;

FIGS. 6–8 are a schematic circuit diagram of the invention;

FIG. 9 is a waveform diagram useful in explaining the operation of the invention;

FIG. 10 is a plan view of the steering wheel of FIG. 1 with cover removed.

DESCRIPTION OF THE PREFERRED EMBODIMENT

With reference to FIGS. 1, 2 and 3 the steering wheel is generally indicated at 10 and comprises a hub 12, spoke-like arm 14 and rim 16. Steering wheel 10 is rotatably carried on steering column 18 in the conventional fashion. The functions or devices which are controlled by the present invention are denoted schematically by blocks 11.

Disposed on arm 14 are a plurality of manually actuable switches arranged in a keypad 20 for controlling a plurality of functions and/or devices disposed on the vehicle (not shown). Switches comprising keypad 20 may, for example, take the form of conventional push button switches or membrane switches. If membrane switches are employed they should preferably be of the type providing a tactile sensation to the operator. Generally, membrane switches are preferred since they are quite economical to mass produce and are hermetically sealed against contamination by dirt and moisture, and provide a low profile. If membrane switches are employed the entire switching assembly can be manufactured on a single sheet or printed circuit board for securing or bonding to the face of arm 14.

With reference to FIG. 3 the invention is illustrated in greater detail as comprising transmitter 22 and receiver 24, which act in concert to convey control information across the boundary or gap 26 between stationary steering column 18 and rotatable steering wheel 10. Transmitter 22 is coupled to switches 20 via a plurality of conductors 27. Similarly, devices 11 are coupled to receiver 24 through conductors 39. Conductors 27 and 39 may be in the form of a bundle of individual conductors, such as a wiring harness, or a flat multiple conductor cable manufactured from individual wires or using printed circuit technology.

In the presently preferred embodiment transmitter 22 emits a radiant energy signal of infrared electromagnetic energy over the wave length spectrum of approximately 910 to 950 nanometers. However, the invention may also be practiced using transmitters broadcasting or emitting radiant energy at other frequencies or in other bands of the electromagnetic or sonic spectrum.

Transmitter 22 includes an output port 28 through which the radiant energy signals are emitted. For transmitters operating in the infrared or optical frequency spectrum, output port 28 may be one or more light emitting diodes, for example. For transmitters operating in the sonic and ultrasonic accoustical spectrum, the output port may be a sonic transducer, and for transmitters operating in the radio frequency electromagnetic spectrum, output port 28 may take the form of an antenna, for example.

Electrical power for operating transmitter 22, is supplied through slip ring 30 and wiper contact 33, wherein steering shaft or axle 34 and other associated electrically conductive members form the ground or return path for electrical current. Preferably transmitter 22 is constructed to operate a power supply voltage range common to the vehicles power supply, that is, nominally 12 volts D.C.

Receiver 24 works in conjunction with transmitter 22 and is tuned to the frequency band covered by transmitter 22. Receiver 24 may be disposed on or within steering column 18, or it may be disposed elsewhere within the vehicle. Receiver 24 includes an input port 36 disposed preferably on or within steering column 18 and positioned to receive the radiant energy signals emitted from output port 28 of transmitter 22. In the presently preferred embodiment, which operates in the infrared spectrum, input port 36 comprises one or more photodiodes positioned so that such photodiode or diodes are in the field of illumination of at least one of the energy emitting transmitter output ports. It will be recognized that in an alternative embodiment operating within the radio frequency spectrum, input port 36 may be implemented using an antenna, whereas in an alternative embodiment operating over an accoustical spectrum, input port 36 may be implemented using an accoustical transducer. Preferably receiver 24 operates from electrical current supplied from the vehicle's power supply source, as through lead 39 and returning through the vehicle ground.

In order to ensure reliability the transmitter receiver pair should be capable of constant communication between their respective output and input ports. In other words, the input port 36 should be disposed within the field of illumination produced by output port 28. For the presently preferred embodiment operating in the infrared spectrum, FIGS. 4 and 5 illustrate the preferred placement of receiver input port and transmitter output port members, respectively. In the preferred embodiment three light emitting diodes 32 are disposed equidistant about the steering shaft or axle 34, and a single photodiode 36 is disposed on the steering column with its input window 40 disposed radially outwardly from steering axle 34 approximately the same distance as light emitting diodes 32 are disposed from axle 34. For higher reliability in certain applications, a greater number of either input or output port members may be utilitzed, and those skilled in the art will readily appreciate how to implement the teachings of the present invention using transmitter receiver pairs operating in different regions of the electromagnetic spectrum or in the accoustical spectrum. To further ensure reliability and immunity from spurious external signals and noise, steering column 18 and steering wheel 10 may be formed with cooperating housings 42 and 44 which shield the receiver input port from unwanted signals and noise originating from sources external to the steering column and steering wheel. It will be seen that generally, however, the infrared and optical embodiments are particularly desirable in that they are immune from ignition noise, CB radio interference, and the like. Embodiments using accoustical energy transmitter receiver pairs are similarly immune from such noise and interference, and those skilled in the art will understand that noise suppression devices and electromagnetic shielding may be required in order to implement the invention using radio frequency embodiments.

Referring now to FIGS. 6–8, the circuit of the present invention will be described in greater detail. In FIGS. 6–8 the transmitter is indicated generally by reference numeral 22 and the receiver generally by reference numeral 24. Transmitter 22 comprises command infrared remote control transmitter module 50. Module 50, which may be implemented using integrated circuit number AY-3-8470 manufactured by General Instrument, provides encoded drive signals suitable for remote control applications in response to keypad or switch actuated signals. For explanation purposes the plurality of terminals provided on module 50 shall be referred to using the pin numbers designated by the manufacture of integrated circuit AY-3-8470. It will be understood that some of these terminals are not connected in the presently preferred embodiment. More particularly, module 50 includes keyboard strobe terminals 5–12 for reading the status of a plurality of switches arranged in a matrix. Module 50 further includes four keyboard input terminals 2, 3, 21 and 22 and three shift input terminals 13, 14 and 15. Power is supplied to module 50 through terminal 1 which may be connected through diode 52 to a source DC current VDD. Terminal 17 of module 50 is coupled to the system ground of the vehicle as at 53. Module 50 further includes clock input terminal 16 and a transmitter output terminal 18. Module 50 includes an internal oscillator circuit which operates in conjunction with an external RC network for fixing the frequency of the transmitter. The RC network comprises resistor R1 coupled between terminals 1 and 16 of module 50; capacitor C2 coupled between terminal 16 of module 50 and ground.

Keypad 20, which may be actuated by the vehicle operator to selectively activate and deactivate various functions and devices within the vehicle, are arranged in a matrix circuit configuration as shown in FIG. 6. More specifically the switches comprising keypad 20 are arranged in a 2×8 matrix comprising sixteen single pole switches each having first and second terminals A and B respectively. The matrix may be seen as comprising two columns and eight rows of switches. Switches 54, 55, 56, 57, 58, 59, 60 and 61, which make up the first column, are mutually coupled as at terminals A to input bus 70, in turn, is coupled to keyboard input terminal 22 of module 50. In a similar fashion, switches 62, 63, 64, 65, 66, 67, 68 and 69, making up the second column, are mutually coupled as at terminals A to input bus 72. Input bus 72 is coupled to keyboard input terminal 21 of module 50. As illustrated in FIG. 6, the columns are arranged in eight rows, each row having two switches although more switches are possible. For example, switches 54 and 62 are coupled as at respective terminals B to strobe bus 74, which is in turn coupled to keyboard strobe terminal 5 of module 50. Similarly, switches 55 and 63 are coupled as at respective terminals B through bus 76 to strobe terminal 6 of module 50. In a similar fashion, the remaining pairs of switches are coupled at terminals B through a strobe bus to one of the keyboard strobe terminals of module 50. Each of the switches of keypad 20 corresponds to a different device or function. For purposes of illustrating the invention certain typical vehicle functions, including cruise control functions, radio seek and scan tuning functions, windshield washer and wiper functions, parking lights, headlight on-off and high-low functions are illustrated. It will of course be understood that such illustration of particular functions is not intended as a limitation of the scope of the invention as set forth in appended claims. In general, the invention may be used to control a wide variety of functions and devices on the vehicle. Sixteen switches and fourteen representative functions have been illustrated for purposes of explaining the invention in its presently preferred embodiment, however the circuit may be readily extended to include a greater number of functions. This might be accomplished, for example, by utilizing keyboard input terminals two and three (not connected in the illustrative embodiment) to expand keypad 20 to a 8×4 matrix as will be understood by those skilled in the art.

The output of module 50 is coupled through output terminal 18 to lead 90, through limiting resistor R2 and coupling capacitor C5 to the base of transistor Q1. Also coupled to the base 91 of transistor Q1 is a current limiting circuit 92 for turning off transistor Q1 if its collector current is too high. The current limiting circuit 92 comprises transistor Q3 with its emitter 94 coupled to ground, its base 97 coupled across load resistor R5, and its collector 98 coupled to base 91 of Q1. Base 91 of Q1 is further coupled to resistor R4 which in turn is coupled to ground. Emitter 96 of Q1 is coupled base 99 of Q2 and further coupled through resistor R3 to ground. The emitter 100 of Q2 is coupled through R5 to ground. The collector of 102 to Q1 and collector 104 of Q2 are coupled together as at node 106. Those skilled in the art will recognize that Q1 and Q2 function generally to amplify signals input at base 91 of Q1, producing an output at node 106.

In accordance with the present invention in its presently preferred embodiment, output node 106 is coupled to series connected light emitting diodes 108, 110 and 112 which are in turn coupled to the source of DC current such as VDD. Diodes 108, 110 and 112 comprises transmitter output port 32.

The transmitter circuit 22 thus described operates in the conventional fashion by strobing keypad 20 to detect which, if any, key is depressed. At the end of a complete keypad scan an output signal is transmitted via output terminal 18. The output signal takes the form of a coded sequence representing an eight bit word followed by its inverse so as to insure reliability. In the presently referred embodiment utilizing the AY-3-8470 integrated circuit transmitter, each bit is divisible into 64 pulses. A "0" bit is comprised of 32 pulses followed by 32 spaces, while a "1" bit is comprised of 48 pulses followed by 18 spaces. In other words, a zero bit represents a burst having a 50% duty cycle, while a "1" bit represents a burst having an 80% duty cycle. By way of further explanation FIG. 9 depicts the first five bits of a typical output word.

Referring now to FIGS. 7 and 8 the receiver 24 of the present invention in its presently preferred embodiment will now be discussed. Receiver 24 comprises photodiode 36 comprising the receiver input port which is coupled to a preamplifier section 120 which is in turn coupled to an amplifier section 122. In the preferred embodiment preamplifier section 120 is based upon a commercially available preamplifier circuit 124, such as integrated circuit preamplifier TDA4180P by Telefunken. Preamplifier 124 is driven by a field effect transistor stage 126 biased in the usual fashion. Photodiode 36 is biased to a source of DC voltage such as at VDD through resistor R9 in series with resistor R1. Resistor R1 is coupled to the cathode 128 of photodiode 36, while the anode 130 of photodiode 36 is coupled through capacitor C3 to the input of transistor stage 126, as at gate terminal 132. Cathode 128 of photodiode 136 is also coupled via capacitor C1 to ground. Thus it will be seen that radiant energy impulses impinging upon photodiode 36 will produce electrical signals or impulses at gate node 132 of transistor stage 126 and coupled through capacitor C4 to the input terminal 134 of preamplifier 124. The output of amplifier 124 at terminal 135 is coupled through capacitor C9 in series with resistor R12 and diode D3 to the base terminal 136 of transistor Q11. Transistors Q11 and Q12, together with the associated biasing resistors R11, R13, R14 and R15, make up amplifier stage 122 as will be understood by those skilled in the art. The output of amplifier stage 122 is applied via lead 138 to a receiver circuit module 140, which may be implemented using a command infrared remote control receiver integrated circuit AY-3-8475, manufactured by General Instrument. For convenience the manufacturer's terminal number designations will be used herein. Module 140 includes a signal input terminal 24 which is coupled to lead 138 to receive amplified signals from amplifier stage 122. Module 140 includes voltage supply terminal 11 for coupling to a source of electrical power as at VDD, a clock terminal 2 for coupling to an RC network which determines the clock frequency of the module, and a second voltage supply terminal 1 which is coupled to system ground as at 142. The RC network includes resistor R17 coupled between the source of supply voltage VDD as at pin 11 and clock terminal 2. The RC network further includes capacitor C10 coupled between clock terminal 2 and system ground as at 142. Module 40 has at least four input/output terminals as follows: terminal 14 (input-/output A), terminal 15 (input/output B), terminal 16 (input/output C) and terminal 17 (input/output D). Those skilled in the art will recognize that the input-/output ports A through D represent four of the eight possible input/output ports found on the commercially available AY-3-8475 integrated circuit. The remaining input/output terminal ports, namely E through H at terminals 20 through 23, may remain unused in the presently preferred embodiment. These unused terminals may be used for controlling additional devices and/or functions on the vehicle by connecting these remaining terminals in accordance with the teachings herein.

Input/output ports A, B, C, and D are coupled through leads 144, 146, 148 and 150, respectively, to the input terminals A, B, C and D of a four to sixteen (binary to decimal) decoder 152 shown in FIG. 8. Decoder 152 may be implemented using a commercially available 4514 integrated circuit which provides sixteen output terminals. Decoder 152 utilizes fourteen of the sixteen output terminals denoted collectively by reference numeral 153. Decoder 152 distributes logic data on the four input terminals to the fourteen output terminals. An input code weighted A=1, B=2, C=4 and D=8 selects the desired output. For instance, an input code 1101 (binary equivalent of decimal 13) will select output 13. As will be explained below, each of the fourteen output terminals is coupled to a circuit or circuits for controlling one or more devices or functions on a vehicle. These functions correspond to the fourteen designated functions of the keypad 20 switches.

The receiver module 140 of the presently preferred embodiment triggers on the corner or knee of the input wave form pulses. Therefore the amplitude of the input pulses should be maintained at less than the supply voltage at VDD in order to insure integrity. This may be done by adjusting the gain of amplifier and preamplifier sections 122 and 120, or by inserting a limiting resistor 139 in series with lead 138.

Having thus described the receiver preamplifer and amplifier sections 120 and 122, together with receiver module 140 and decoder 152, the focus will now be directed toward a variety of control circuits for actuating various devices or vehicle functions. It will be recognized that the specific circuits employed will depend in part upon what devices or functions are to be controlled, as well as the particular electrical characteristics of the devices involved. Thus the following is representative of a typical complement of functions and devices. Generally, however, the invention is usable with a wide range of devices and is not in any way limited to the devices illustrated in the drawings and described herein.

Referring to FIG. 8 the circuit for controlling the vehicle's headlights and parking lights will be discussed. For purposes of this explanation it will be assumed that four of the output terminals 153 of decoder 152 convey information relative to the headlight and parking light operation hereinafter referred to as terminals 207, 208, 209 and 210. Terminal 207 conveys parking light signals, terminal 208 conveys lights "off" signals, and terminals 209 and 210 convey headlight low beam and high beam signals respectively. Terminal 209 is coupled to the set terminal S of the JK flipflop 154 while terminal 210 is coupled to the reset terminal R of flipflop 154. Also coupled to output terminals 209 and 210 of decoder 152 are a pair of OR gates 156 and 158, each having a pair of input terminals, the first terminal of each being coupled to terminal 209 of decoder 152 and the other terminal of each being coupled to terminal 210 of decoder 152. The output OR gate 156 is coupled via lead 159 to the set terminal S of JK flipflop 160 while the reset terminal R thereof is coupled to output terminal 208 of decoder 152. The Q output of flipflop 160 is coupled to a first terminal A of AND gate 162 and also coupled to a first terminal A of a second AND gate 164. A second terminal B of AND gate 162 is coupled to the Q output terminal of flipflop 154, while a second terminal B of AND gate 164 is coupled to the $\overline{Q}$ output terminal of flipflop 154. The output of OR gate 158 is coupled through diode 166 to the set terminal S of a third JK flipflop 170. The reset terminal R of flipflop 170 is coupled to output terminal 208 of decoder 152. The headlight control circuit further comprises three darlington transistors Q13, Q14, and Q15. Transistor Q13, which provides an output control signal for actuating the vehicle's low beam headlights, is coupled through resistor 172 to the output of AND gate 162. Transistor Q14 provides an output control signal for actuating the vehicle high beam headlights and is coupled through resistor 174 to the output of AND gate 164. Similarly, transistor Q15 provides an output control signal for actuating the vehicle's parking lights and is coupled through resistor 176 to the Q output of flipflop 170.

In operation, flipflop 160, which is responsive to OR gate 156, is set when decoder 152 sends either a low beam signal (terminal 209) or a high beam signal (terminal 210). By setting flipflop 160 the Q output thereof enables AND gates 162 and 164 by placing a logical high signal at their respective input terminals A. In this state AND gates 162 and 164 may be toggled on and off in response to logical signals applied to input terminals B. Such logical signals are provided by flipflop 154, wherein the Q output controls AND gate 162 while the logical complement $\overline{Q}$ output controls AND gate 164. When low beams are selected, for example, flipflop 154 is set thus causing AND gate 162 to exhibit a logical high signal at its output while simultaneously causing AND gate 164 to display a logical low signal at its output. These output signals drive transistor Q13 into conduction, turning on the low beams, while leaving transistor Q14 in its quiescent or "off" state so that the high beams are not actuated. If the high beams are selected for example, flipflop 154 is reset causing the Q output to go low and the $\overline{Q}$ output to go high. This toggles AND gate 162 into an "off" state and simultaneously toggles AND gate 164 into an "on" state, turning off the low beams while turning on the high beams. Either high beams or low beam may be turned off by sending a logical high signal on output terminal 208 of decoder 152 which resets flipflop 160, and also flipflop 170. By resetting flipflop 160 AND gates 162 and 164 are no longer enabled and thus both produce logical low outputs, turning off high beams and low beams alike.

The parking lights may be actuated by outputting a logical high signal on terminal 207 of decoder 152. This sets flipflop 170 placing a logical high signal on the Q output thereof. Flipflop 170 is also set by OR gate 158 when either high beams or low beams are selected. Likewise, placing a logical high signal at output terminal 208 of decoder 152 resets flipflop 170, turning off the parking lights whenever the "lights off" control logic signal is transmitted.

The control circuit for selecting windshield wiper high speed/low speed operation comprises JK flipflop 180, JK flipflop 182, OR gate 184, and a pair of AND gates 186 and 188. Flipflop 182 which is responsive to OR gate 184 serves to enable both low speed wiper and high speed wiper functions when either function has been selected. Output terminal 205 of decoder 152 corresponds to the low speed wiper logic control signal while terminal 204 corresponds to the high speed wiper control signal. Terminal 206 of decoder 152 provides the wiper off signal. When a logical high signal is placed on terminal 205 of decoder 152, as occurs when a low wiper speed is selected, AND gates 186 and 188 are enabled by virtue of the operation of flipflop 182 and OR gate 184. In addition, flipflop 180 is set causing its Q output to go high while complementary $\overline{Q}$ output goes low. AND gate 186 thereupon produced a logical high signal which drives darlington transistor pair Q16 into conduction, turning on the wipers at low speed. If a high wiper speed is desired terminal 204 of decoder 152 outputs a high signal which resets flipflop 180 causing AND gate 186 to turn off and AND gate 188 to turn on. This causes darlington transistor pair Q17 to conduct, turning on the high speed wiper function. If a logical high signal is output on output terminal 206 of decoder 152, signaling a wiper "off" condition, flipflop 182 is reset, whereupon AND gates 186 and 188 are no longer enabled and thus transistors Q16 and Q17 are both nonconductive.

Certain other functions, such as windshield washer, radio tuner seek and scan, and cruise control functions like cruise on, coast and resume, may be implemented using the circuit illustrated in FIG. 8. In general, each of these functions may be implemented by using substantially the same driver circuits. Accordingly, the driver circuit for the windshield washer device will be described in detail, and it will be understood that the remaining functions are implemented in essentially the same way. In the presently preferred embodiment illustrated herein, the control logic signal on output terminal 218 of decoder 152 corresponds to the windshield washer circuit. This control logic signal is passed through an interfacing circuit or buffer 190 and then transmitted via lead 192, through resistor 194 to the base of driver transistor 196. When the control logic signal at terminal 218 of decoder 152 is high, signifying that the windshield washer has been selected, driver transistor 196 is driven into conduction turning on the windshield washer. Other devices and functions operate in a similar fashion wherein terminal 217 of decoder 152 corresponds to the radio tuner scan circuit, terminal 220 corresponds to the radio tuner seek circuit, terminal 219 to the cruise on circuit, terminal 214 to the cruise set circuit, terminal 213 to the cruise resume circuit, and terminal 216 to the cruise coast circuit. As illustrated in FIG. 8 each of the control logic signals is buffered through buffer 190 for isolation from the driver transistor. Buffer 190, as illustrated in FIG. 8, may be implemented using an integrated circuit containing a multiplicity of individual buffer circuits. In the presently preferred embodiment six buffers corresponding to the six above mentioned functions are required, and thus buffer 190 may be implemented using a commercially available hex noninverting buffer such as the 4050 integrated circuit.

In addition to providing an "on-off" control, the invention is also capable of controlling devices requiring more complex control signals. The radio volume control, for instance, receives signals from analog output terminal 5 of receiver module 140. These signals represent analog levels which may be used to increment or decrement the volume control using the circuit which will be described in reference to FIG. 7. Receiver module 140 provides such analog levels in response to encoded commands from transmitter 50. The analog outputs of receiver module 140 are variable mark space ratio outputs at a frequency of typically 20 KHz. The mark space ratio defines the analog level and can be varied between the ratio extremes, nominally from 1:62 to 62:1.

With reference to FIG. 7 circuit 400 is used to control the radio volume control in response to these analog output signals. Circuit 400 comprises coupling capacitor 402 connected between diode 404, as at mode 405 and terminal 5 of receiver module 140. A second diode 406 is coupled between mode 405 and ground. Diode 404 is in turn coupled to operational amplifier stage 408 and the output of stage 408 is coupled through diode 410 to the radio volume control device.

While the preferred embodiment of the present invention has thus been described in detail, those skilled in the art will recognize that certain modifications may be made without departing from the scope of the invention as set forth in the appended claims. For instance, while the invention finds immediate utility in controlling a plurality of devices for vehicle functions, by controlling those devices or functions directly, the invention may also be interfaced with a microprocessor device which in turn controls the vehicle functions and devices. In this implementation the multifunction steering wheel of the present invention may be viewed as a very convenient input device for providing control signals to a microprocessor or microcomputer onboard the vehicle. This is particularly true in view of the fact that the present invention provides an eight bit data bus which could be readily adapted to interface directly with many of the eight bit microprocessor devices available today. It will be also evident to those skilled in the art that, while the transmitter output port and receiver input port are preferably disposed in close proximity to one another on the steering wheel and steering column respectively, the receiver input port, for example, might also be disposed elsewhere within the broadcast range of the transmitter.

While the invention finds utility in vehicles such as automotive vehicles, passenger cars, trucks, buses, etc., the invention is equally useful in other types of vehicles, including but not limited to, tractors and farm equipment, heavy duty construction and earth moving vehicles, boats, planes, and so forth. Furthermore, it will be understood that spoke-like arm 14 may take many different shapes, even dish-shaped, or partially dish-shaped without departing from the scope of the invention.

What is claimed is:

1. A multifunction steering wheel for controlling the operation of devices disposed on a vehicle having a steering column comprising:

steering wheel member rotatably carried on said steering column and having a hollow spokelike arm;

manually actuable hermetically sealed keypad disposed on said steering wheel member, said keypad comprising a plurality of individual switches connected in a matrix configuration;

a transmitter module disposed within said arm and coupled to said switches, said transmitter module having encoder means for providing strobe signals to said switching and having an input bus coupled to said switches for interrogating said switches, said encoder means further having an output means for providing predetermined encoded output pulses in response to activation of said switches;

said transmitter module having transistor driver circuit comprising a first transistor having the base thereof coupled to said output means of said encoder and comprising a second transistor having the base thereof coupled to the emitter of said first transistor and said first and second transistors having their respective collectors coupled together to provide an output node;

said transmitter module further having a current limiting circuit comprising load resistor coupled between the emitter of said second transistor and ground and comprising a third transistor having the base thereof coupled to said load resistor and having the emitter thereof coupled to ground and having the collector thereof coupled to the base of said first transistor and further having second resistor coupled between the collector of said third transistor and ground;

said current limiting circuit being operable to sense the collector current of said first transistor and to turn off said first transistor to prevent excessive current flow;

a plurality of mutually connected light emitting diodes coupled to said output node of said driver circuit for producing light impulses in accordance with said output pulses, said light emitting diodes being equally spaced about a circular locus and positioned to direct illumination toward said steering column;

a receiver module positioned within said steering column, said receiver module including a phototransistor mounted to receive illumination from said light emitting diodes, and further including amplifier circuit capacitively coupled to said phototransistor for providing amplified signals in accordance with said output pulses;

a decoder module positioned within said steering column and receptive of said amplified signals, said decoder module providing a plurality of input/output ports for providing a binary signals indicative of said encoded output pulses, said decoder module further including binary to decimal decoder means for receiving said binary signals and providing a plurality of individual output terminals, each terminal corresponding to a different one of said devices disposed on a vehicle; and at least one flip flop means coupled to said output terminals for controlling at least one of said devices.

* * * * *